United States Patent
Seo et al.

(10) Patent No.: US 9,143,299 B2
(45) Date of Patent: Sep. 22, 2015

(54) METHOD AND DEVICE FOR TRANSMITTING A SOUNDING REFERENCE SIGNAL

(75) Inventors: Han Byul Seo, Anyang-si (KR); Byoung Hoon Kim, Anyang-si (KR); Ki Jun Kim, Anyang-si (KR); Hak Seong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 13/574,735

(22) PCT Filed: Feb. 1, 2011

(86) PCT No.: PCT/KR2011/000692
§ 371 (c)(1),
(2), (4) Date: Jul. 23, 2012

(87) PCT Pub. No.: WO2011/096699
PCT Pub. Date: Aug. 11, 2011

(65) Prior Publication Data
US 2012/0287900 A1   Nov. 15, 2012

Related U.S. Application Data

(60) Provisional application No. 61/301,624, filed on Feb. 4, 2010.

(30) Foreign Application Priority Data

Jan. 31, 2011   (KR) ........................ 10-2011-0009481

(51) Int. Cl.
*H04L 5/00*   (2006.01)

(52) U.S. Cl.
CPC ............. *H04L 5/0051* (2013.01); *H04L 5/0053* (2013.01)

(58) Field of Classification Search
None
See application file for complete search history.

(56) References Cited

U.S. PATENT DOCUMENTS

2008/0267269 A1* 10/2008 Enescu et al. ................. 375/219
2009/0109908 A1   4/2009 Bertrand et al.
(Continued)

FOREIGN PATENT DOCUMENTS

CN         101617489 A        12/2009
CN         102356675 A         2/2012
(Continued)

OTHER PUBLICATIONS

3GPP Tsg Ran WG1 Meeting #59bis; R1-10037; Agenda Item 7.4.2; Nokia Siemens Networks, Nokia; "Channel sounding enhacements for LTE-Advanced"; Valencia, Spain' Jan. 18-22, 2010; pp. 1-3.
(Continued)

*Primary Examiner* — Kerri Rose
(74) *Attorney, Agent, or Firm* — Birch, Stewart, Kolasch & Birch, LLP

(57) ABSTRACT

The present invention provides a method and device for transmitting a sounding reference signal on a wireless communication system. More specifically, the present invention relates to an SRS transmission method comprising the steps of: receiving cell-specific parameters for constituting a SRS; receiving first terminal-specific parameters designating a resource which can be used in the non-periodic transmission of the SRS; receiving request information whereby SRS transmission is requested; and, after the request information has been received, transmitting the SRS by using the resource allocated by means of the first terminal-specific parameters; wherein the SRS is transmitted inside subframes designated by means of the cell-specific parameters, and the present invention also relates to a device for the same.

15 Claims, 18 Drawing Sheets

(56) References Cited

U.S. PATENT DOCUMENTS

| | | |
|---|---|---|
| 2009/0239476 A1 | 9/2009 | Womack et al. |
| 2009/0274226 A1* | 11/2009 | Mondal et al. ............... 375/260 |
| 2010/0002647 A1 | 1/2010 | Ahn et al. |
| 2010/0246561 A1* | 9/2010 | Shin et al. ................... 370/345 |
| 2014/0036859 A1* | 2/2014 | Ekpenyong et al. .......... 370/330 |
| 2014/0146777 A1 | 5/2014 | Shin et al. |

FOREIGN PATENT DOCUMENTS

| | | |
|---|---|---|
| JP | 2012-529778 A | 11/2012 |
| KR | 10-2008-0112115 A | 12/2008 |
| WO | WO 2008/132597 A2 | 11/2008 |
| WO | WO 2009/058806 A1 | 5/2009 |
| WO | WO 2011/083746 A1 | 7/2011 |

OTHER PUBLICATIONS

Mitsubishi Electric Research Laboratories, Cambridge, Massachusetts; "UL SRS Control Signaling for Closed Loop Antenna Selection (AS)"; Tdoc Number: R1-080803; Agenda Item: 6.1.2; Sorrento, Italy; Feb 11-15, 2008; pp. 1-17.

\* cited by examiner

METHOD AND DEVICE FOR TRANSMITTING A SOUNDING REFERENCE SIGNAL

CROSS REFERENCE TO RELATED APPLICATIONS

This application is the National Phase of PCT/KR2011/000692 filed on Feb. 1, 2011, which claims priority under 35 U.S.C. 119(e) to U.S. Provisional Application Nos. 61/301,624, filed on Feb. 4, 2010, and under 35 U.S.C 119(a) to Patent Application No. 10-2011-0009481 filed in the Republic of Korea on Jan. 31, 2011, all of which are hereby expressly incorporated by reference into the present application.

TECHNICAL FIELD

The present invention relates to a wireless communication system, and more particularly, to a method and device for transmitting a sounding reference signal.

BACKGROUND ART

Wireless communication systems have been diversified in order to provide various types of communication services such as voice or data service. In general, a radio communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system and the like.

DISCLOSURE

Technical Problem

An object of the present invention is to provide a method and device for efficiently transmitting a sounding reference signal in a wireless communication system.

The technical problems solved by the present invention are not limited to the above technical problems and those skilled in the art may understand other technical problems from the following description.

Technical Solution

The object of the present invention can be achieved by providing a method of transmitting a sounding reference signal (SRS) in a wireless communication system, the method including receiving a cell-specific parameter for SRS configuration, receiving a first UE-specific parameter indicating resources which may be used for aperiodic transmission of the SRS, receiving request information for requesting SRS transmission, and transmitting the SRS using the resources allocated by the first UE-specific parameter after receiving the request information, wherein the SRS is transmitted within subframes indicated by the cell-specific parameter.

According to another aspect of the present invention, there is provided a device configured to transmit a sounding reference signal (SRS) in a wireless communication system, the device including a radio frequency (RF) unit, and a microprocessor, wherein the microprocessor is configured to receive a cell-specific parameter for SRS configuration, receive a first UE-specific parameter indicating resources which may be used for aperiodic transmission of the SRS, receive request information for requesting SRS transmission, and transmit the SRS using the resources allocated by the first UE-specific parameter after receiving the request information, wherein the SRS is transmitted within subframes indicated by the cell-specific parameter.

The subframes in which the SRS may be aperiodically transmitted may be periodically located within the subframes indicated by the cell-specific parameter.

The SRS may be transmitted using a closest subframe among the subframes, in which the SRS may be aperiodically transmitted, after a predetermined time has elapsed from the reception of the request information.

The cell-specific parameter and the first UE-specific parameter may be received through radio resource control (RRC) signaling and the request information may be received through a physical downlink control channel (PDCCH).

The method may further include receiving a second UE-specific parameter for periodic transmission of the SRS, and periodically transmitting the SRS using the resources allocated by the second UE-specific parameter.

Advantageous Effects

According to the embodiments of the present invention, it is possible to efficiently transmit a sounding reference signal in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

The configuration, the operation and the other features of the embodiments of the present invention will be described with reference to the accompanying drawings. The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, or a Multi Carrier Frequency Division Multiple Access (MC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A $3^{rd}$ Generation Partnership Project Long Term Evolution (3GPP LTE) communication system is part of the E-UMTS (Evolved UMTS) which employs the E-UTRA. The LTE-Advanced (LTE-A) is an evolved version of the 3GPP LTE.

The following embodiments focus on the 3GPP system to which the technical features of the present invention are applied, but the present invention is not limited thereto.

Figure 1:
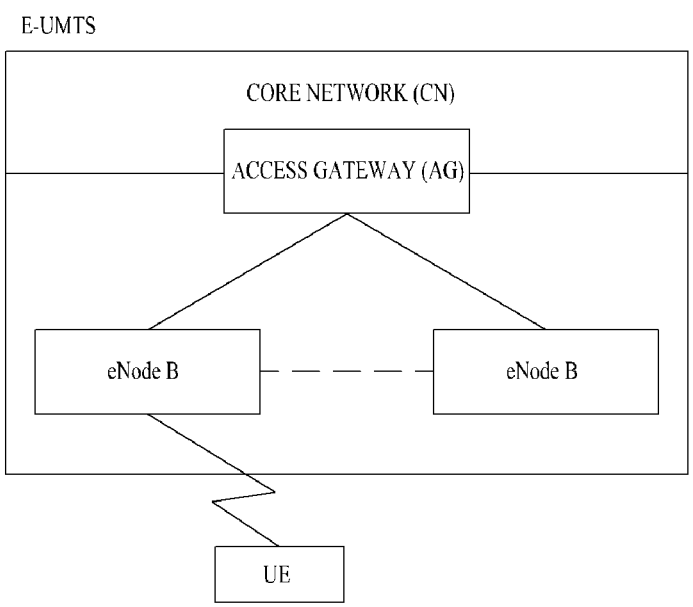
FIG. 1 is a diagram showing a network structure of an Evolved Universal Mobile Telecommunications System (E-UMTS)

FIG. 1 is a diagram showing a network architecture of an E-UMTS. The E-UMTS is also referred to as a Long Term Evolution (LTE) system. Communication networks are widely distributed to provide various communication services such as voice and packet data services.

Referring to FIG. 1, the E-UMTS mainly includes an Evolved Universal Terrestrial Radio Access Network (E-UTRAN), an Evolved Packet Core (EPC) and a User Equipment (UE). The E-UTRAN includes one or more base stations (eNode Bs or eNBs) 20 and one or more UEs 10 may be located in one cell. A mobility management entity/system architecture evolution (MME/SAE) gateway 30 is located at an end of a network and is connected to an external network. Downlink refers to communication from the eNode B 20 to the UE 10 and uplink refers to communication from the UE to the eNode B.

The UE 10 is a communication device held by a user and the eNode B 20 is generally a fixed station communicating with the UE 10. The eNode B 20 provides an endpoint of a user plane and a control plane to the UE 10. A cell may exist for one eNode B 20. An interface for transmitting user traffic or control traffic to the eNode B 20 may be used. The MME/SAE gateway 30 provides an endpoint of a session and mobility management function to the UE 10. The eNode B 20 and the MME/SAE gateway 30 may be connected through an S1 interface.

MME provides various functions such as distribution of a paging message to the eNode Bs 20, security control, idle state mobility control, SAE bearer control and encryption and integrity protection of non access stratum (NAS) signaling. The SAE gateway host provides various functions including user plane switching for plane packet completion and mobility support of the UE 10. The MME/SAE gateway 30 is briefly referred to as a gateway in the present specification. However, the MME/SAE gateway 30 includes both the MME gateway and the SAE gateway.

A plurality of nodes may be connected between the eNode B 20 and the gateway 30 through an S1 interface. The eNode Bs 20 may be connected to each other through an X2 interface and neighboring eNode Bs may have a mesh network structure employing the X2 interface.

Figure 2:
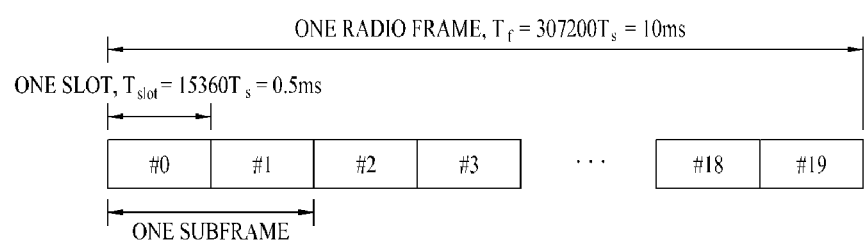
FIG. 2 is a diagram showing the structure of a radio frame of a 3$^{rd}$ Generation Partnership Project (3GPP) system.

FIG. 2 is a diagram showing the structure of a radio frame of a $3^{rd}$ Generation Partnership Project (3GPP) system.

Referring to FIG. 2, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols or SC-FDMA symbols in a time domain, and includes a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The structure of the radio frame is only exemplary and the number of subframes, the number of subslots, or the number of OFDM/SC-FDMA symbols may be variously changed in the radio frame.

Figure 3:
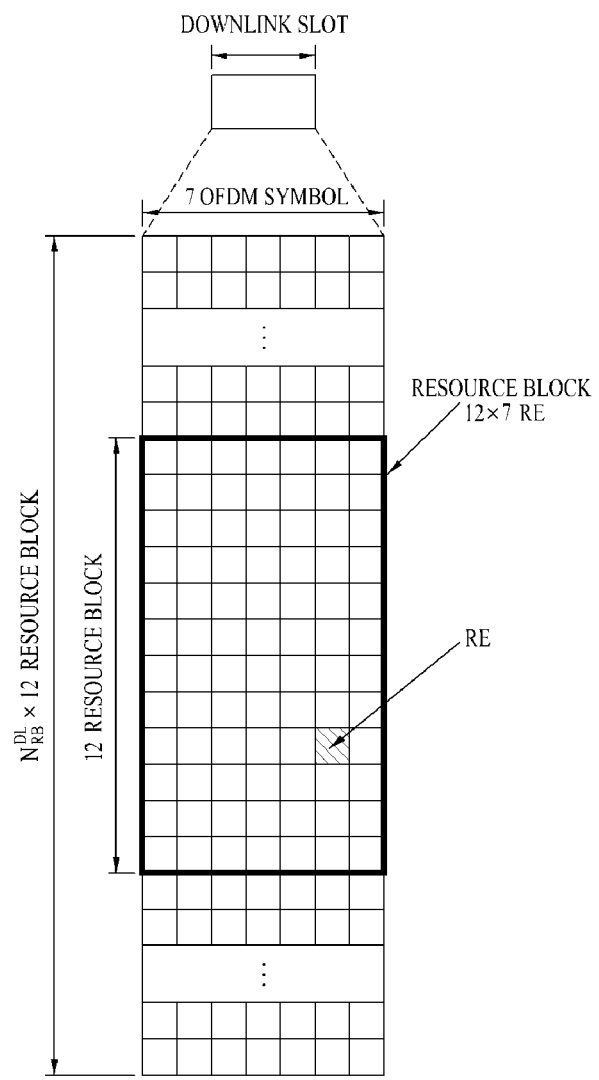
FIG. 3 is a diagram showing a resource grid of a downlink slot.

FIG. 3 is a diagram showing a resource grid of a downlink slot.

Referring to FIG. 3, a downlink slot includes a plurality of OFDM symbols (e.g., seven) in a time domain and $N^{DL}_{RB}$ RBs in a frequency domain. Since each RB includes 12 subcarriers, the downlink slot includes $N^{DL}_{RB} \times 12$ subcarriers in the frequency domain. Although FIG. 3 shows the case in which the downlink slot includes seven OFDM symbols and the RB includes 12 subcarriers, the present invention is not limited thereto. For example, the number of OFDM symbols included in the downlink slot may be changed according to the length of a cyclic prefix (CP). Each element of the resource grid is referred to as a resource element (RE). The RE is a minimum time/frequency resources defined in a physical channel and is indicated by one OFDM symbol index and one subcarrier index. One RB includes $N^{DL}_{symb} \times N^{RB}_{sc}$ REs. $N^{DL}_{symb}$ denotes the number of OFDM symbols in the downlink slot and $N^{RB}_{sc}$ denotes the number of subcarriers included in the RB. The number NDLRB of RBs included in the downlink slot depends on a downlink transmission bandwidth set in a cell.

The downlink slot structure shown in FIG. 3 is equally applied to an uplink slot structure. The uplink slot structure includes SC-FDMA symbols instead of the OFDM symbols.

Figure 4:
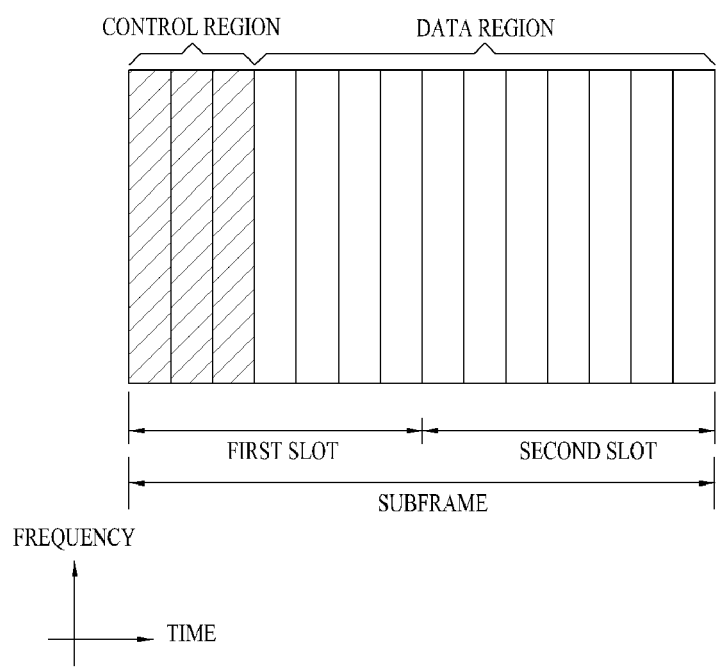
FIG. 4 is a diagram showing the structure of a downlink subframe.

FIG. 4 is a diagram showing the structure of a downlink subframe in a 3GPP system.

Referring to FIG. 4, one or more OFDM symbols located in a front portion of the subframe are used in a control region and the remaining OFDM symbols are used in a data region. The size of the control region may be independently set per subframe. The control region is used to transmit scheduling information and layer 1/layer 2 (L1/L2) control information. The data region is used to transmit traffic. The control channel includes a Physical Control Format Indicator Channel (PC-FICH), a Physical Hybrid automatic repeat request (ARQ) Indicator Channel (PHICH), a Physical Downlink Control Channel (PDCCH), etc. The traffic channel includes a Physical Downlink Shared Channel (PDSCH).

The PDCCH may inform a UE or a UE group of resource allocation information about resource allocation of a paging channel (PCH) or a Downlink Shared Channel (DL-SCH) which is a transport channel, uplink scheduling grant, HARQ information, etc. The PCH and the DL-SCH are transmitted through a PDSCH. Accordingly, an eNode B and a UE generally transmit and receive data through a PDSCH except for specific control information or specific service data. Control information transmitted through a PDCCH is referred to downlink control information (DCI). The DCI indicates uplink resource allocation information, downlink resource allocation information and an uplink transmit power control command for arbitrary UE groups. The eNode B decides a PDCCH format according to DCI to be sent to the UE and attaches a cyclic redundancy check (CRC) to control information. The CRC is masked with a unique identifier (e.g., a Radio Network Temporary Identifier (RNTI)) according to an owner or usage of the PDCCH.

Figure 5:
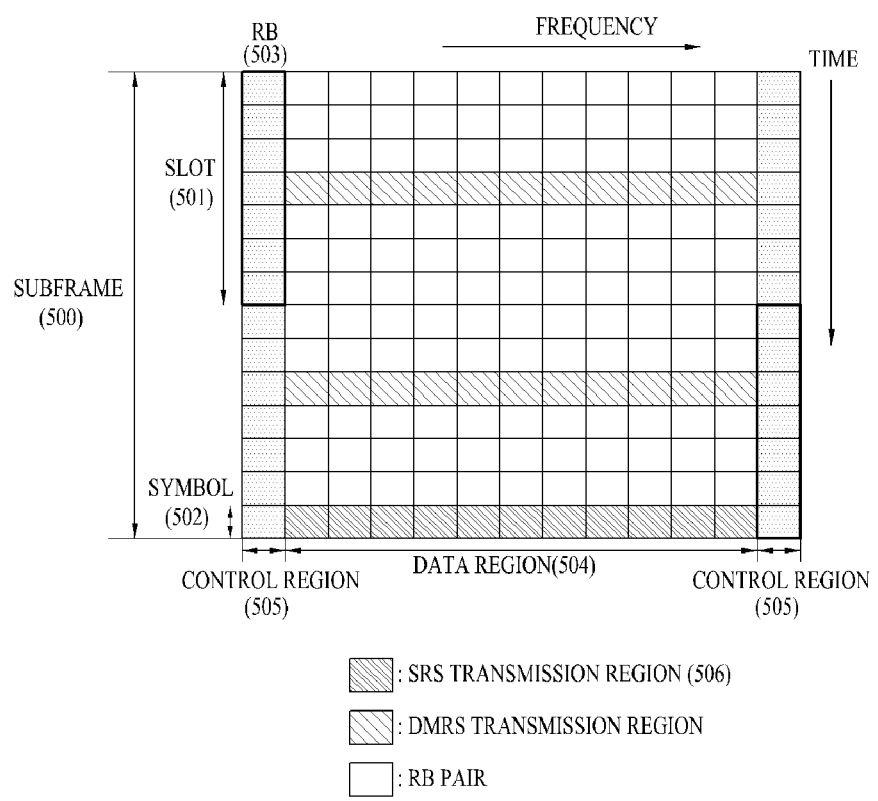
FIG. 5 is a diagram showing the structure of an uplink subframe used in a system.

FIG. 5 is a diagram showing the structure of an uplink subframe used in a 3GPP system.

Referring to FIG. 5, a subframe having a length of 1 ms which is a basic unit of LTE uplink transmission includes two slots 501 each having a length of 0.5 ms. In the case of a length of a normal Cyclic Prefix (CP), each slot includes seven symbols 502 and one symbol corresponds to one Single carrier-Frequency Division Multiple Access (SC-FDMA) symbol. An RB 503 is a resource allocation unit corresponding to 12 subcarriers in a frequency domain and one slot in a time domain. The structure of the uplink subframe of the LTE system is roughly divided into a data region 504 and a control region 505. The data region refers to communication resources used for data transmission, such as voice or packets transmitted to each UE, and includes a physical uplink shared channel (PUSCH). The control region refers to communication resources used to transmit an uplink control signal such as a downlink channel quality report from each UE, reception ACK/NACK of a downlink signal, an uplink scheduling request or the like, and includes a Physical Uplink Control Channel (PUCCH). A sounding reference signal (SRS) is transmitted through a last SC-FDMA symbol of one subframe on a time axis. SRSs of several UEs transmitted through the last SC-FDMA of the same subframe are distinguished according to a frequency position/sequence.

In the existing 3GPP Rel-9 (LTE), an SRS is only periodically transmitted. A configuration for periodic transmission of an SRS is configured by a cell-specific SRS parameter and a UE-specific SRS parameter. The cell-specific SRS parameter (a cell-specific SRS configuration) and the UE-specific SRS parameter (a UE-specific SRS configuration) are transmitted to a UE through higher layer (e.g., RRC) signaling.

The cell-specific SRS parameter includes srs-BandwidthConfig and srs-SubframeConfig. srs-BandwidthConfig indicates information about a frequency bandwidth in which an SRS may be transmitted and srs-SubframeConfig indicates information about a subframe in which an SRS may be transmitted. A subframe in which an SRS may be transmitted within a cell is periodically set in a frame. Table 1 shows srs-SubframeConfig in the cell-specific SRS parameter.

TABLE 1

| srs-SubframeConfig | Binary | Configuration Period $T_{SFC}$ (subframes) | Transmission offset $\Delta_{SFC}$ (subframes) |
| --- | --- | --- | --- |
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | Reserved |

$T_{SFC}$ denotes a cell-specific subframe configuration and $\Delta_{SFC}$ denotes a cell-specific subframe offset. srs-SubframeConfig is provided by a higher layer.

An SRS is transmitted through a subframe satisfying floor $(n_s/2) \bmod T_{SFC} \in \Delta_{SFC}$. $N_s$ denotes a slot index. floor( ) is a flooring function and mod denotes a modulo operation.

The UE-specific SRS parameter includes srs-Bandwidth, srs-HoppingBandwidth, freqDomainPosition, srs-ConfigIndex, transmissionComb and cyclicShift. srs-Bandwidth indicates a value used to set a frequency bandwidth in which a UE should transmit an SRS. srs-HoppingBandwidth indicates a value used to set frequency hopping of an SRS. freqDomainPosition indicates a value used to determine a frequency position where an SRS is transmitted. srs-ConfigIndex indicates a value used to set a subframe in which a UE should transmit an SRS. transmissionComb indicates a value used to set an SRS transmission Comb. cyclicShift indicates a valued used to set a cyclic shift value applied to an SRS sequence.

Tables 2 and 3 show an SRS periodicity and a subframe offset according to srs-ConfigIndex. The SRS transmission periodicity indicates a time interval (unit: subframe or ms) in which a UE should periodically transmit an SRS. Table 2 shows an FDD case and Table 3 shows a TDD case. The SRS configuration index $I_{SRS}$ is signaled on a per UE basis and each UE confirms the SRS transmission periodicity $T_{SRS}$ and the SRS subframe offset $T_{offset}$ using the SRS configuration index $I_{SRS}$.

TABLE 2

| SRS Configuration Index $I_{SRS}$ | SRS Periodicity $T_{SRS}$ (ms) | SRS Subframe Offset $T_{offset}$ |
| --- | --- | --- |
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

TABLE 3

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

In summary, in the existing 3GPP Rel-9 (LTE), the cell-specific SRS parameter indicates subframes occupied for SRS transmission within a cell to a UE and the UE-specific SRS parameter indicates subframes, which will actually be used by the UE, among the subframes occupied for SRS transmission. The UE periodically transmits an SRS through a specific symbol (e.g., a last symbol) of the subframe specified as the UE-specific SRS parameter. More specifically, the SRS is periodically transmitted in a subframe satisfying Equation 1.

$$(10 \cdot n_f + k_{SRS} - T_{offset}) \bmod T_{SRS} = 0$$

(FDD case, TDD with $T_{SRS} > 2$ case)

$$(k_{SRS} - T_{offset}) \bmod 5 = 0 \qquad \text{Equation 1}$$

(TDD with $T_{SRS} = 2$ case)

where, $n_f$ denotes a frame index, $T_{SRS}$ denotes an SRS transmission periodicity and $T_{offset}$ denotes a (subframe) offset for SRS transmission. $k_{SRS}$ denotes a subframe index in the frame $n_f$. In the case of FDD, $k_{SRS} = \{0, 1, \ldots, \text{and } 9\}$. In the case of TDD, $k_{SRS}$ is shown in Table 4.

TABLE 4

| | subframe index n | | | | | | | | | | |
|---|---|---|---|---|---|---|---|---|---|---|---|
| | | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

In order to protect SRS transmission in the subframe occupied through the cell-specific SRS parameter, a UE may not transmit an uplink signal through a last symbol of a subframe regardless of whether or not an SRS is actually transmitted in the subframe.

Figure 6:
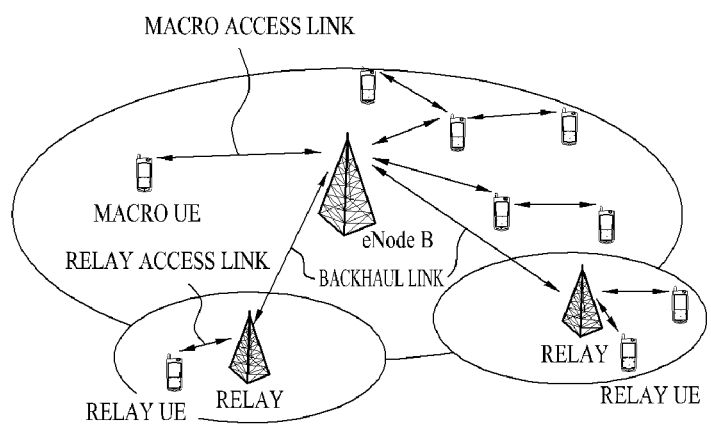
FIG. 6 is a diagram showing a wireless communication system including a relay node (RN)

FIG. 6 is a diagram showing a wireless communication system including a relay node (RN). The RN expands a service area of an eNode B or is placed in a shadow area to provide a service even in the shadow area. Referring to FIG. 6, the wireless communication system includes an eNode B, an RN and a UE. The UE performs communication with the eNode B or the RN. For convenience, a UE which performs communication with an eNode B is referred to as a macro UE and a UE which performs communication with the RN is referred to as a relay UE. A communication link between an eNode B and a macro UE is referred to as a macro access link and a communication link between an RN and a relay UE is referred to as a relay access link. In addition, a communication link between an eNode B and an RN is referred to as a backhaul link.

The RN may be divided into a layer 1 (L1) relay, a layer 2 (L2) relay and a layer 3 (L3) relay, depending on how many functions are performed in multi-hop transmission. The respective features of the RNs will now be described. An L1 relay performs a function of a general repeater and amplifies a signal received from an eNode B or a UE and transmits the signal to a UE or an eNode B. In this case, since the RN does not perform decoding, transmission delay is short. However, since a signal and noise are not distinguished, noise may also be amplified. In order to solve this problem, an advanced repeater or a smart repeater having a UL power control function or a self-interference cancellation function may be used. An operation of the L2 relay may be expressed by decode-and-forward and user plane traffic may be transmitted through the L2 relay. In this case, noise is not amplified, but delay is increased due to decoding. The L3 relay is also referred to as self-backhauling and an IP packet may be transmitted through the L3 relay. The L3 relay includes a radio resource control (RRC) function and serves as a small eNode B.

The L1 and L2 relays may be parts of a donor cell covered by an eNode B. If the RN is part of the donor cell, since the RN cannot control a cell of the RN and UEs of the cell, the RN cannot have a cell ID thereof. However, the RN may have a relay ID. In this case, some functions of radio resource management (RRM) are controlled by the eNode B of the donor cell and some functions of RRM is performed by the RN. The L3 relay can control a cell thereof. In this case, the RN can manage one or more cells and each cell managed by the RN may have a unique physical-layer cell ID. The L3 relay may have the same RRM mechanism as the eNode B. From the viewpoint of the UE, it makes no different whether the cell managed by the RN or the cell managed by the eNode B is accessed.

In addition, a relay node (RN) is divided as follows according to mobility.

Fixed RN: permanently fixed and used to decrease a shadow area or increase cell coverage. This may also function as a repeater.

Nomadic RN: may be temporarily mounted or arbitrarily moved into a building when the number of users is suddenly increased.

Mobile RN: may be mounted in public transportation such as a bus or a subway and should support mobility of the RN.

In addition, a link between an RN and a network is divided as follows.

In-band connection: A network-to-RN link and a network-to-UE link share the same frequency band in a donor cell.

Out-band connection: A network-to-RN link and a network-to-UE link use different frequency bands in a donor cell.

In addition, the RN is divided as follows depending on whether a UE recognizes presence of the RN.

Transparent RN: A UE is not aware of whether communication with a network is performed through an RN.

Non-transparent RN: A UE is aware of whether communication with a network is performed through an RN.

Figure 7:
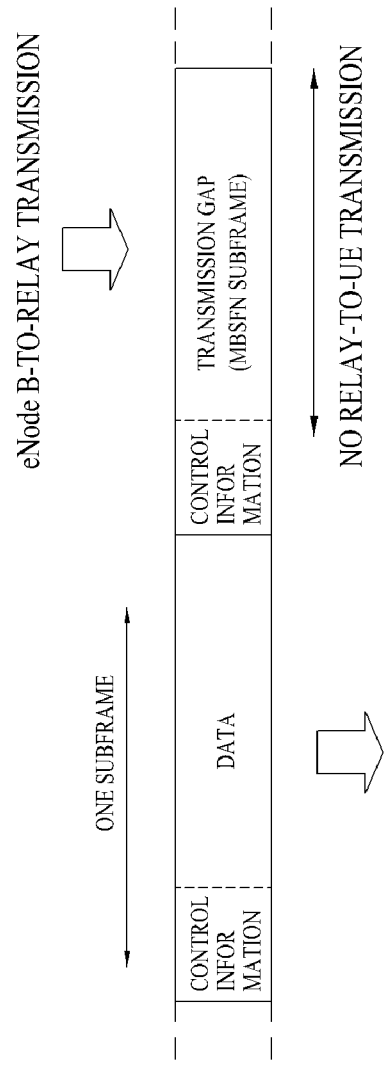
FIG. 7 is a diagram showing backhaul communication using a multi-media broadcast over a single frequency network (MBSFN) subframe.

FIG. 7 is a diagram showing an example of performing backhaul communication using a multimedia broadcast over a single frequency network (MBSFN) subframe. In an in-band relay mode, a link between an eNode B and an RN (that is, a backhaul link) operates in the same frequency band as a link between an RN and a UE (that is, a relay access link). In the case in which an RN transmits a signal to a UE while receiving a signal from an eNode B, a transmitter and a receiver of the RN causes interference. Thus, simultaneous transmission and reception of the RN may be prevented. Therefore, the backhaul link and the relay access link are partitioned using a TDM scheme. LTE-A establishes a backhaul link in a MBSFN subframe in order to support a measurement operation of a legacy LTE UE present in a relay zone (fake MBSFN method). In the case in which an arbitrary subframe is signaled through an MBSFN subframe, since a UE receives only a control region ctrl of the subframe, an RN may configure a backhaul link using the data region of the subframe. For example, a relay PDCCH (R-PDCCH) is transmitted using a specific resource region from a third OFDM symbol to a last OFDM symbol of the MBSFN subframe.

In one embodiment of the present invention, a configuration method associated with SRS transmission in an uplink backhaul subframe in which an RN transmits a signal to an eNode B is proposed.

In general, the number and positions of SC-FDMA symbols which may be used for uplink transmission of an RN in a backhaul subframe may be determined according to a method of adjusting a subframe boundary between the eNode B and the RN and a time required to switch transmission and reception operations by the RN.

Figure 8:
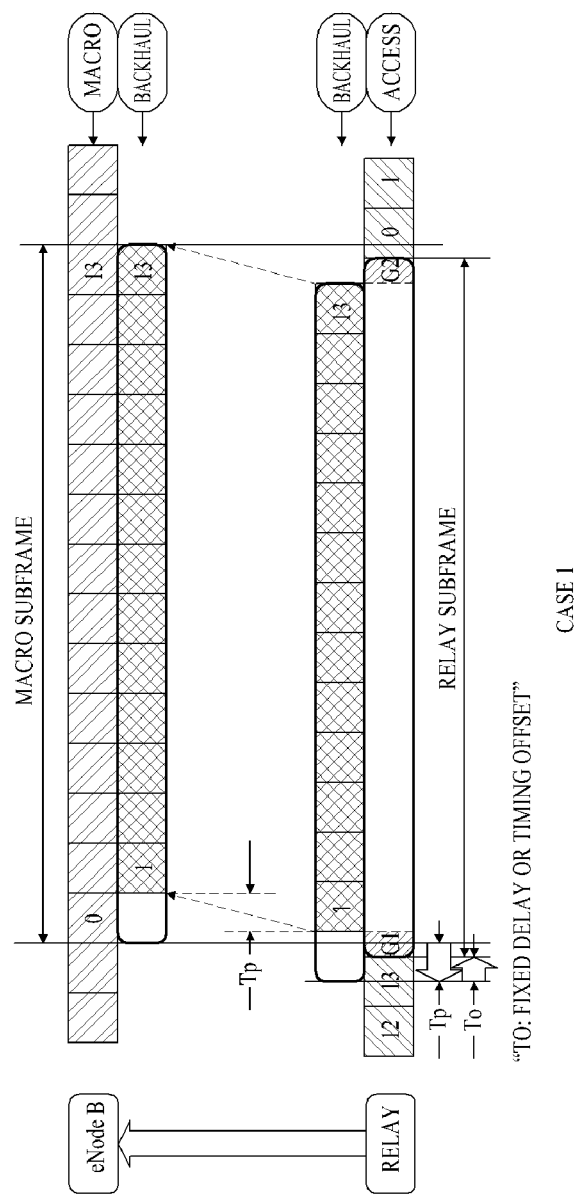
FIGS. 8 to 11 are diagrams illustrating methods of adjusting a boundary of an access subframe and a backhaul subframe.

FIGS. 8 to 11 are diagrams illustrating methods of adjusting boundaries of an access subframe and a backhaul subframe. The figures show a normal CP case. In the figures, G1 and G2 respectively denote times required for RX/TX switching and TX/RX switching of an RN and Tp denotes propagation delay between an eNode B and the RN. The following cases are possible:

Case 1: A boundary of an access UL subframe and a boundary of a backhaul UL subframe are staggered by a constant gap. More specifically, fixed delay To is added to the propagation delay Tp with respect to an access UL subframe (FIG. 8). Referring to FIG. 8, the RN may transmit a backhaul UL subframe after a guard time G1 upon completing reception of an access UL subframe. Since a last symbol of the access UL subframe and a first symbol of a backhaul UL subframe overlap, the backhaul UL subframe may be transmitted through SC-FDMA symbols 1 to 13. Thereafter, if transmission of the backhaul UL subframe is completed, the RN may receive the access UL subframe after a guard time G2.

Case 2: The RN performs transmission through an SC-FDMA symbol 0 to a last symbol (SC-FDMA symbol 13) of a backhaul UL subframe (FIGS. 9 to 10).

Figure 9:
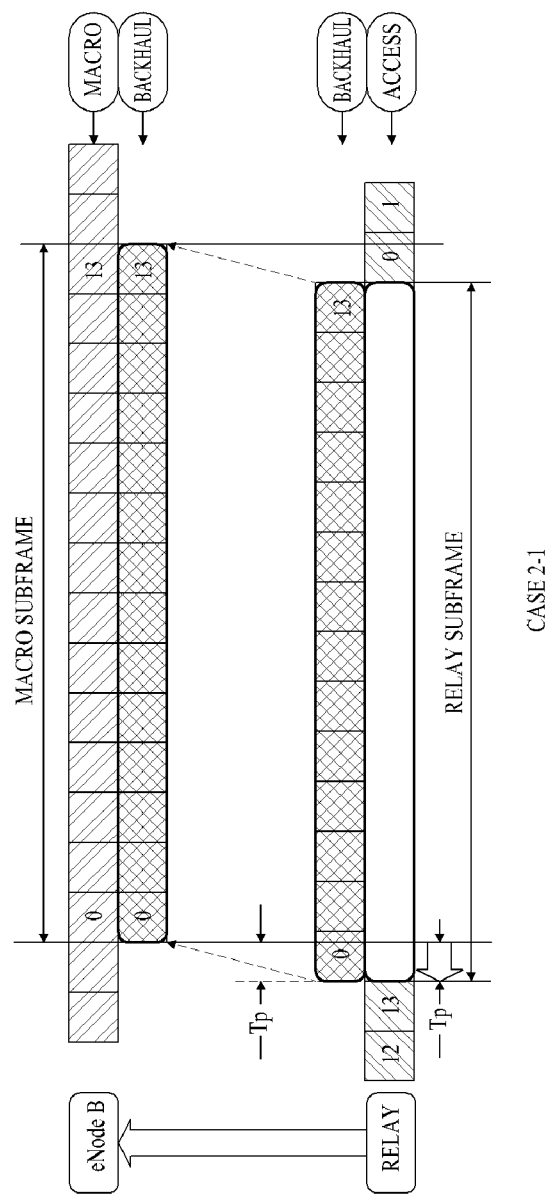
Figure 10:
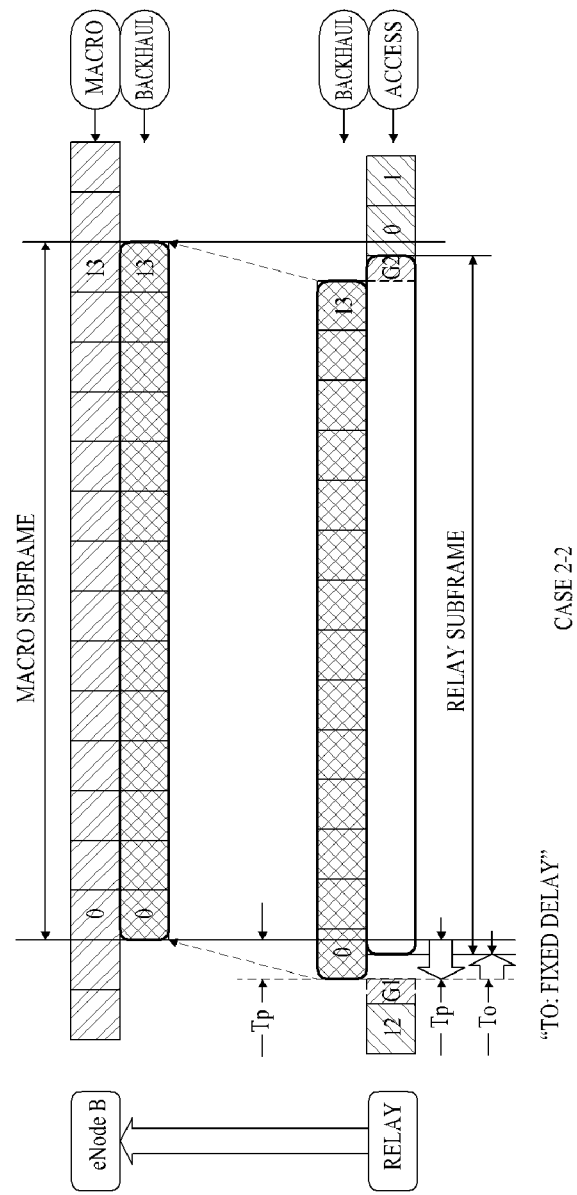

In Case 2-1, the boundary of the access UL subframe aligns with the boundary of the backhaul UL subframe and a RN switching time is very short (<CP) (FIG. 9). Since times required for RX/TX switching and TX/RX switching are included in the CP, the RN may transmit the backhaul subframe without loss.

In Case 2-2, a boundary of an access UL subframe and a boundary of a backhaul UL subframe are staggered by a constant gap. More specifically, fixed delay To is added to the propagation delay Tp with respect to an access UL subframe and a last SC-FDMA symbol of the access UL subframe is punctured for RN switching (FIG. 10). Referring to FIG. 10, the last SC-FDMA symbol punctured in the access UL subframe is used as guard times G1 and G2. Accordingly, the RN may transmit the backhaul subframe without loss.

Figure 11:
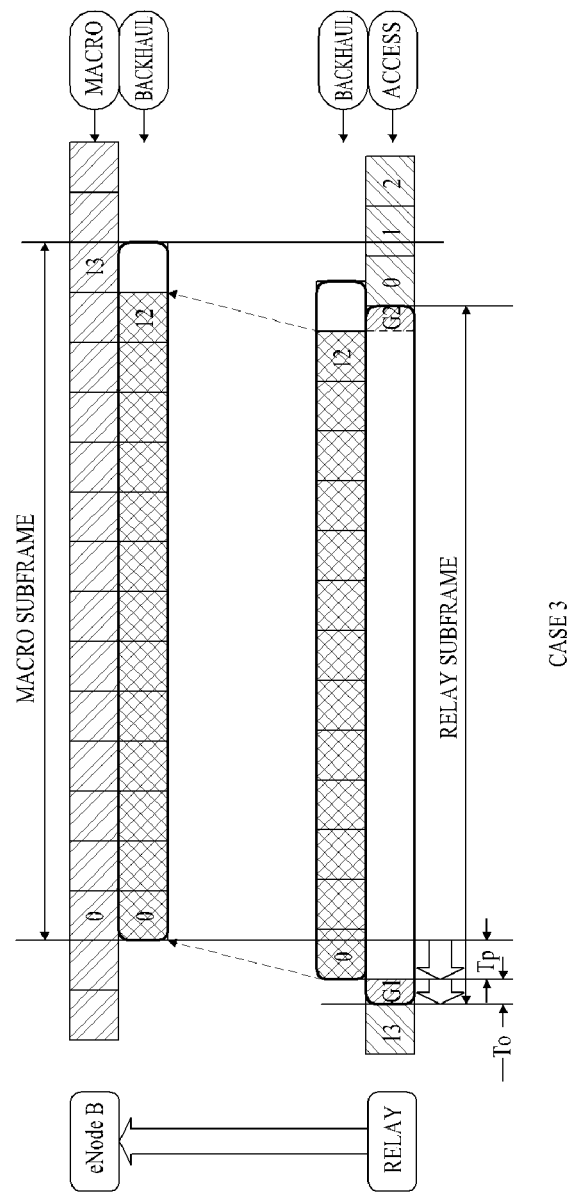

Case 3: A boundary of an access UL subframe and a boundary of a backhaul UL subframe are staggered by a constant gap. More specifically, fixed delay To is added to the propagation delay Tp with respect to an access UL subframe (FIG. 11). Referring to FIG. 11, the RN may transmit a backhaul UL subframe after a guard time G1 upon completing reception of an access UL subframe. Since a last symbol of the access UL subframe and a first symbol of a backhaul UL subframe are shifted from each other by the guard time G1, the backhaul UL subframe may be transmitted through SC-FDMA symbols 0 to 12 (normal CP case). Thereafter, if transmission of the backhaul UL subframe is completed, the RN may receive the access UL subframe after a guard time G2.

In Case 1, Case 2-1 and Case 2-2, the RN may transmit the last symbol (the SC-FDMA symbol 13 in the normal CP case). Accordingly, the RN may transmit an SRS using the same scheme as macro UEs using the last SC-FDMA symbol.

Figure 12:
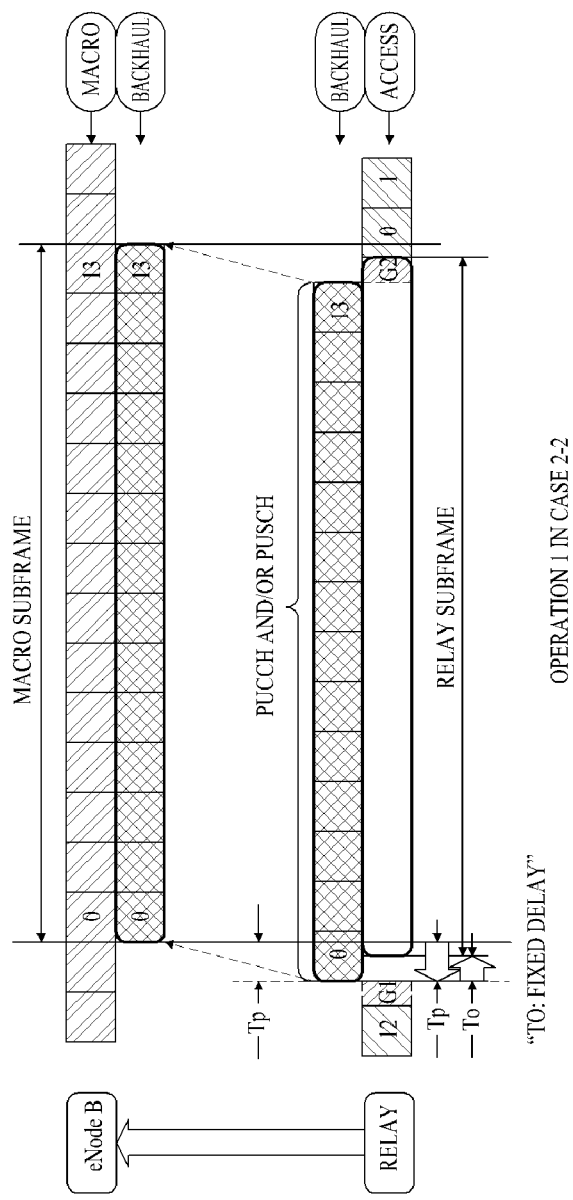
FIGS. 12 to 14 are diagrams showing the operation of an RN in a backhaul subframe.
Figure 13:
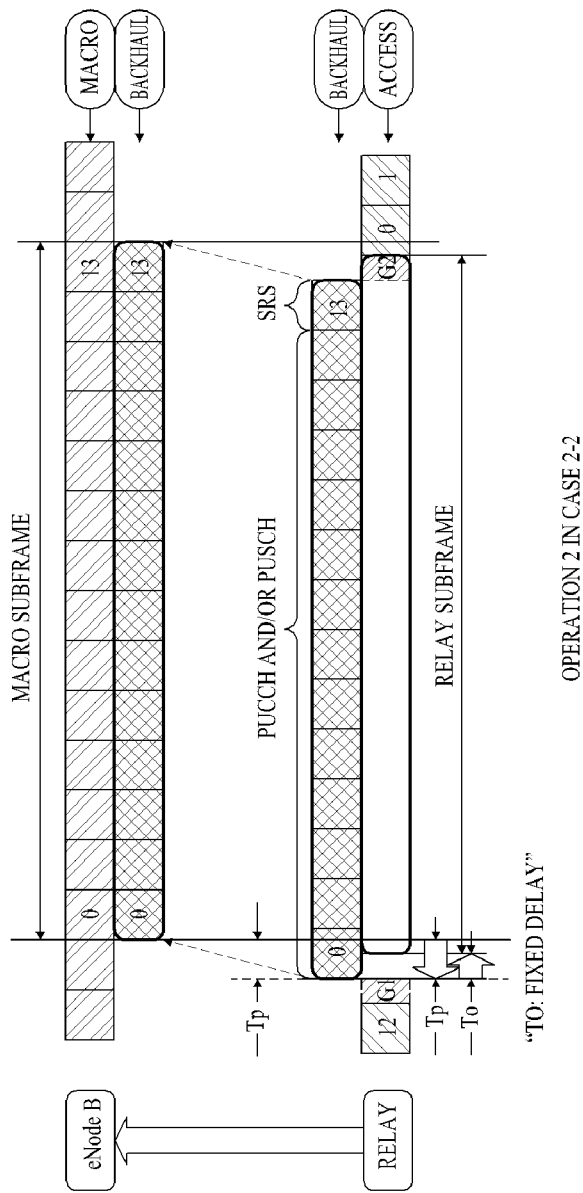
Figure 14:
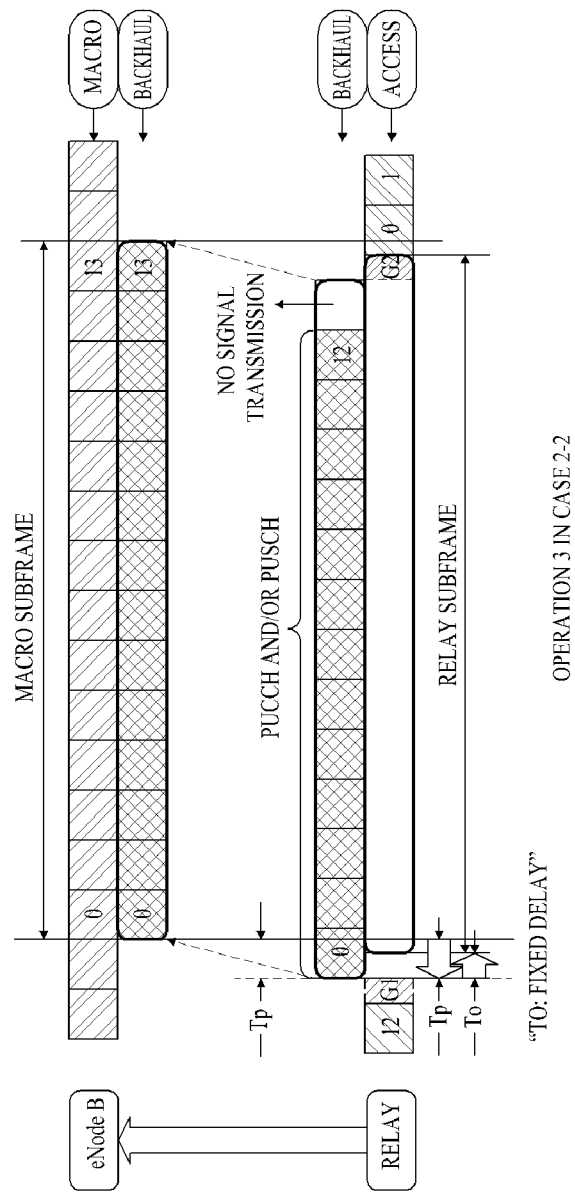

FIGS. 12 to 14 are diagrams showing the operation of an RN in a backhaul subframe. The operation of the RN may be divided into the following three operations according to an SRS transmission configuration. For convenience, Case 2-2 shown in FIG. 10 will be focused upon.

Operation 1: The RN performs a normal operation at a last SC-FDMA symbol of a backhaul subframe. The RN may transmit a PUCCH of a normal format and transmit a PUSCH through up to a last SC-FDM symbol of the backhaul subframe (FIG. 12).

Operation 2: The RN transmits an SRS at a last SC-FDMA symbol of the backhaul subframe. Accordingly, the RN should use a PUCCH of a shortened format and complete PUSCH transmission at a symbol located just before the last SC-FDMA symbol (FIG. 13).

Operation 3: The RN does not transmit a signal at a last SC-FDMA symbol of the backhaul subframe in order to protect SRS transmission of a macro UE. Accordingly, the RN should use a PUCCH of a shortened format and complete PUSCH transmission at a symbol located just before the last SC-FDMA symbol, but does not perform SRS transmission (FIG. 14).

Since the RN cannot receive a signal from a relay UE until a TX/RX switching time has elapsed, if TX/RX switching is present at the end of the backhaul subframe, the RN may not receive a signal from the relay UE until the backhaul subframe is completed. Accordingly, if the RN does not transmit a signal at a last SC-FDMA symbol for some reason, the last SC-FDMA symbol is not used for signal transmission and reception and thus is wasted.

Accordingly, in the present invention, a TX/RX switching position is moved forward by a constant time (e.g., one symbol) in the case in which the RN does not transmit a signal at the last SC-FDMA symbol of the backhaul subframe (e.g., Operation 3 of FIG. 14). In this case, the RN may receive the signal of the relay UE using the whole or part of the last SC-FDMA symbol of the access subframe overlapping the backhaul subframe. In this case, the last SC-FDMA symbol may be used for SRS transmission of the relay UE.

Figure 15:
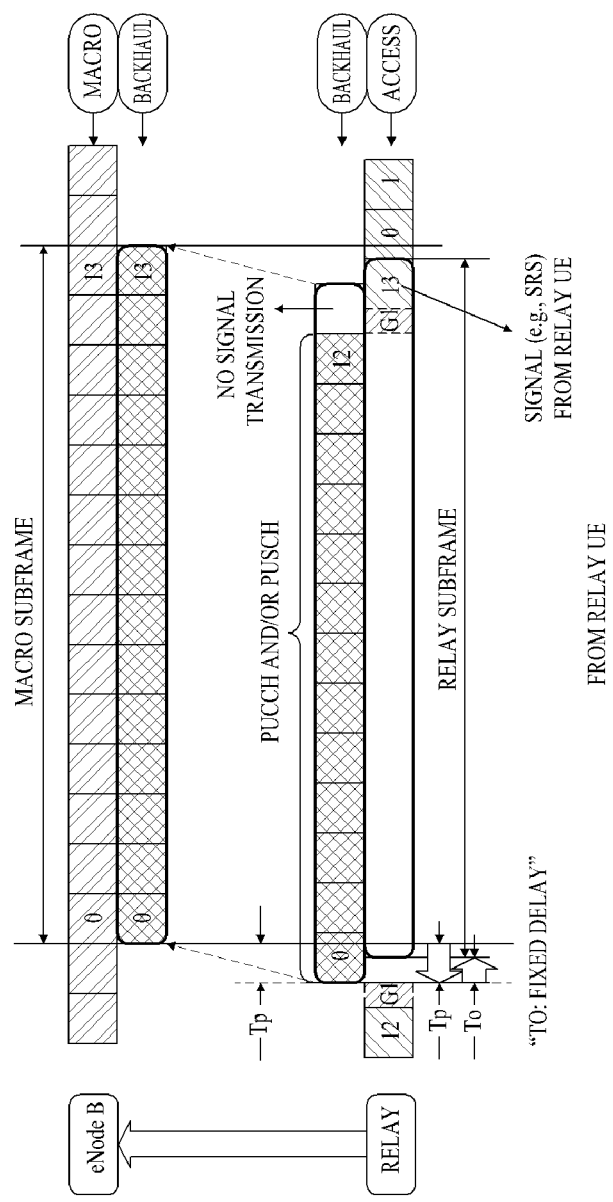
FIG. 15 is a diagram showing an operation of an RN in a backhaul subframe according to an embodiment of the present invention.

FIG. 15 is a diagram showing an operation of an RN in a backhaul subframe according to an embodiment of the present invention.

Referring to FIG. 15, in the case of Operation 3 shown in FIG. 14, the RN does not transmit the signal at the SC-FDMA symbol 13. Accordingly, the RN may transmit the signal using up to the SC-FDMA symbol 12 and start TX/RX switching one SC-FDMA symbol earlier. As a result, since the RN may receive the signal from the relay UE at the last SC-FDMA symbol of the backhaul subframe, radio resource efficiency is increased. Preferably, the last SC-FDMA symbol may be used for SRS transmission of the relay UE.

For the above-described operation, the RN may include, for example, an access subframe corresponding to a backhaul subframe, in which Operation 3 is performed, in a cell-specific SRS configuration of a relay cell. Alternatively, for convenience of SRS configuration, the RN may include all access subframes corresponding to backhaul subframes in the cell-specific SRS configuration of the relay cell, without considering the operation performed in the backhaul subframe. Alternatively, for a simpler SRS configuration, the RN may include all access subframes overlapping the backhaul subframes in a cell-specific SRS configuration of the relay cell. The last method may be efficient when an access subframe preceding the backhaul subframe should use a shortened PUCCH format as in Case 2-2.

As another embodiment of the present invention, a method of dividing an operation of an RN in a backhaul subframe will be described. SRS transmission was established in a semi-static manner in the versions of up to 3GPP Rel-9 (LTE). That is, an eNode B divides a whole subframe into a subframe in which SRS transmission may be performed and a subframe in which SRS transmission may not be performed and inform UEs of the subframe in which SRS transmission may be performed as a semi-static cell-specific SRS configuration. In the subframe included in the cell-specific SRS configuration, all UEs do not transmit a PUCCH and a PUSCH at a last SC-FDMA symbol. The eNode B informs UEs of a UE-specific SRS configuration in a semi-static manner and the UEs periodically perform SRS transmission using specified resources in the subframe included in the UE-specific SRS configuration. If such a semi-static SRS configuration is applied to the RN, the subframe of Operation 1 may be a subframe which is not included in the cell-specific SRS configuration, the subframe of Operation 2 may be a subframe which is included in the cell-specific SRS configuration and is included in the UE-specific SRS configuration for the RN, and the subframe of Operation 3 may be a subframe which is included in the cell-specific SRS configuration but is not included in the UE-specific SRS configuration for the RN. As a result, the backhaul subframe operations shown in FIGS. 12 to 14 may be divided only by signaling a semi-static SRS configuration present in LTE Rel-9.

In versions subsequent to 3GPP Rel-10 (LTE-A), a scheme for dynamically configuring an SRS may be introduced. Such dynamic SRS configuration means an operation in which an eNode B transmits a scheduling signal using a dynamic scheme (that is, an aperiodic scheme) and instructs a UE (or an RN) to transmit an SRS only at a specific time. SRS transmission may be dynamically scheduled through physical control channel signaling (e.g., a PDCCH or an R-PDCCH). If an RN receives a dynamic SRS configuration from an eNode B, backhaul subframe operations are no longer divided in a semi-static manner. Accordingly, there is a modified scheme for dividing SRS subframes.

Accordingly, as another embodiment of the present invention, an uplink backhaul subframe is divided into the following three types, for the above-described dynamic SRS configuration.

Subframe Type 1: The RN performs a normal operation at a last SC-FDMA symbol. That is, a PUCCH of a normal format may be transmitted and a PUSCH may also be transmitted through up to a last SC-FDMA symbol.

Subframe Type 2: The RN transmits a PUCCH of a shortened format, transmission of a PUSCH is completed at a symbol located just before a last SC-FDMA symbol, and TX/RX switching is not performed before the last SC-FDMA symbol.

Subframe Type 3: The RN transmits a PUCCH of a shortened format and transmission of a PUSCH is completed at a symbol located just before a last SC-FDMA symbol. TX/RX switching is performed at a symbol located just before the last SC-FDMA symbol. As a result, the signal of the relay UE may be received at a last SC-FDMA symbol of an access subframe overlapping the backhaul subframe.

The division of the subframe type and the division of the RN operation are different in that whether or not an SRS is transmitted in the backhaul subframe is not considered in the division of the subframe type. Subframe Type 1 has the same attributes as the subframe for performing Operation 1, but both Operation 2 and Operation 3 are possible in Subframe Type 2. More specifically, all the subframes for performing Operation 2 become Subframe Type 2. More specifically, all the subframes for performing Operation 2 become Subframe Type 2. However, some of the subframes for performing Operation 3 may become Subframe Type 2 and correspond to subframes in which the eNode B may potentially schedule a dynamic SRS. Among subframes for performing Operation 3, subframes in which an eNode B may not schedule a dynamic SRS correspond to Subframe Type 3. That is, subframes for performing Operation 3 become Subframe Type 2 or 3 depending on whether a dynamic SRS may be scheduled. For example, the RN should perform the operation of FIG. 14 in the backhaul subframe of Type 2 and perform the operation of FIG. 15 in the backhaul subframe of Type 3.

As another embodiment of the present invention, a signal indicating a subframe, in which a dynamic SRS may be scheduled, among subframes included in a cell-specific SRS configuration may be transmitted from an eNode B to an RN. For example, a signal indicating a subframe, in which a dynamic SRS may be scheduled, among subframes for performing Operation 3 (that is, subframes which are included in a cell-specific SRS configuration but are not included in a UE-specific SRS configuration for the RN) may be transmitted from an eNode B to an RN. A UE-specific SRS configuration (or a UE-specific SRS parameter) signal indicating that a dynamic SRS may be scheduled may be transmitted from an eNode B to an RN. More specifically, a UE-specific SRS configuration indicating resources which may be used for aperiodic transmission of an SRS may be transmitted from an eNode B to an RN. The eNode B includes a 1-bit indicator in the UE-specific SRS configuration to be transmitted to the RN so as to indicate whether an SRS is always transmitted in a subframe included in the UE-specific SRS configuration or whether an SRS is transmitted only when a dynamic SRS is scheduled in the subframe. For example, if the indicator is set to 0, the SRS may always be transmitted in the UE-specific subframe periodically as in 3GPP Rel-9 and, if the indicator is set to 1, the SRS may be transmitted only when the dynamic SRS is scheduled. On the contrary, the RN may transmit a signal indicating a subframe, in which TX/RX switching will be performed, to the eNode B one symbol earlier in order to receive the signal of a UE connected thereto.

If a specific backhaul subframe is set to Type 2 according to the above-described scheme (or if a subframe in which a dynamic SRS may be scheduled is set), the RN must not perform TX/RX switching before a last SC-FDMA symbol in the corresponding subframe and must operate in a TX mode up to the last symbol. This is because potential dynamic SRS scheduling should be awaited. In addition, preferably, the UE connected to the RN does not transmit an SRS in an access subframe overlapping such a subframe.

Figure 16:
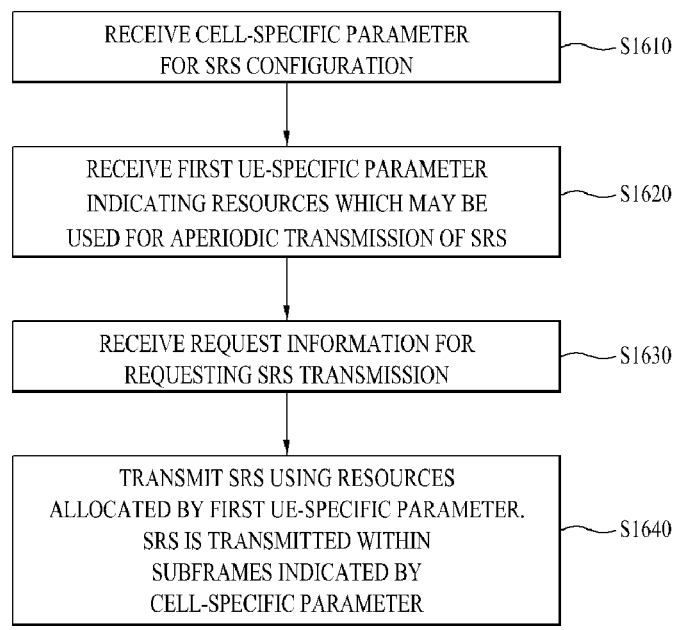
FIGS. 16 to 17 are diagrams illustrating a method of aperiodically transmitting an SRS according to an embodiment of the present invention.
Figure 17:
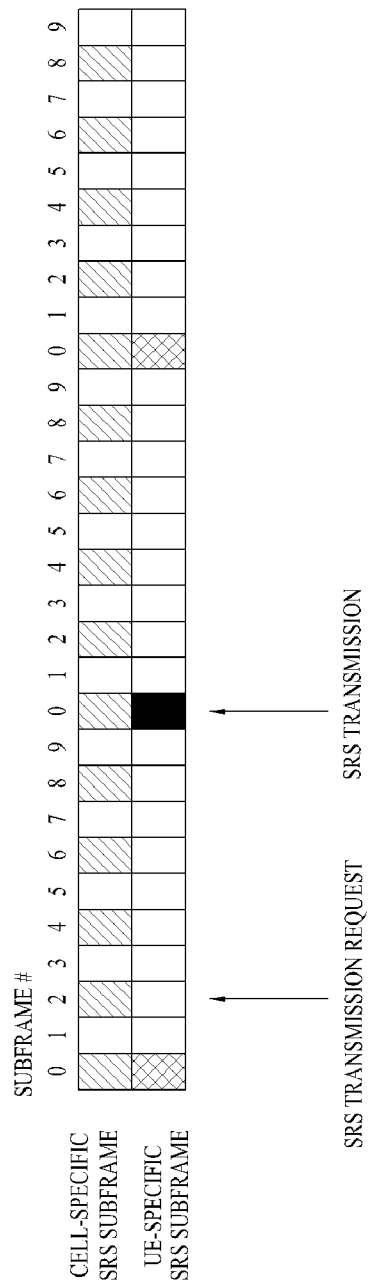

FIGS. 16 to 17 are diagrams illustrating a method of dynamically (aperiodically) transmitting an SRS according to an embodiment of the present invention.

Referring to FIG. 16, the RN receives a cell-specific parameter for SRS configuration from the eNode B (S1610). The cell-specific parameter includes srs-BandwidthConfig and srs-SubframeConfig. srs-BandwidthConfig indicates information about a frequency bandwidth in which the SRS may be transmitted and srs-SubframeConfig indicates information about a subframe in which the SRS may be transmitted. In addition, the RN receives, from the eNode B, a UE-specific parameter indicating resources which may be used for aperiodic transmission of the SRS (S1620). The UE-specific parameter for aperiodic transmission of the SRS includes, but is not limited to, at least one of srs-Bandwidth, srs-HoppingBandwidth, freqDomainPosition, srs-ConfigIndex and transmissionComb and cyclicShift. The cell-specific parameter of step S1610 and the UE-specific parameter of step S1620 may be forwarded from the eNode B to the RN through higher layer signaling (e.g., RRC signaling). Step S1610 and step S1620 may be performed separately or through the same message.

Thereafter, the RN receives request information for SRS transmission from the eNode B (S1630). The SRS request information may be received through a physical downlink control channel (e.g., an R-PDCCH). The SRS request information may be explicitly included in downlink control information (DCI) of an R-PDCCH or may be implicitly included in an R-PDCCH through masking or scrambling. When the RN receives the SRS request information, the RN transmits the SRS to the eNode B using resources allocated by a UE-specific parameter of step S6120 (S1640). At this time, the SRS is transmitted in subframes indicated by the cell-specific parameter of step S1610.

The subframes in which the SRS may be a periodically transmitted may be periodically located within the subframes indicated by the cell-specific parameter of step S1610. For example, the subframes in which the SRS may be a periodically transmitted may be given by an SRS transmission periodicity TSRS and an SRS subframe offset Toffset. In this case, the SRS may be transmitted in a subframe satisfying Equation 1. For reference, Equation 1 is as follows:

FDD case, TDD with $T_{SRS} > 2$ case $(10 \cdot n_f + k_{SRS} - T_{offset}) \bmod T_{SRS} = 0$ TDD with $T_{SRS} = 2$ case $(k_{SRS} - T_{offset}) \bmod 5 = 0$ Where, $n_f$ and $k_{SRS}$ are identical to definitions of Equation 1.

In the case in which the SRS is transmitted by a request of the eNode B, there is an additional limitation to Equation 1. In the case in which the RN receives the SRS request information in step S1630, a basic time required to process (e.g., decode or demodulate) the information is necessary. For example, in the case of HARQ ACK/NACK, HARQ ACK/NACK is transmitted after four subframes from a subframe in which downlink data is received. Accordingly, the SRS transmission of step S1640 may be performed after N subframes from the subframe in which the SRS request information is received in step S1630 (e.g., N=4). Accordingly, the SRS transmission of step S1640 may be performed in a subframe corresponding to Equation 1 after the N subframes from the subframe in which the SRS request information is received in step S1630.

Referring to FIG. 17, the cell-specific SRS subframe is set at an interval of 2 subframes. In contrast, the UE-specific SRS subframe is set at an interval of 10 subframes. That is, the UE-specific SRS subframe has an SRS transmission periodicity TSRS of 10 subrmaes (or ms) and an SRS subframe offset Toffset of 0 subframe (or ms). The UE-specific SRS subframe means a subframe in which an aperiodic SRS may be transmitted. As shown, if an SRS transmission request is received at subframe #2 of a first frame, the RN transmits an SRS to the eNode B through a close UE-specific SRS subframe (here, subframe #0 of a second frame). As shown, if it is assumed that the SRS transmission request is received at subframe #8 of a first frame, a sufficient signal processing time may not be ensured between the subframe in which the SRS transmission request is received and the subframe #0 of the second frame. In this case, the RN transmits the SRS to the eNode B through a closest UE-specific SRS subframe (here, subframe #0 of a third frame) after a time required to process the SRS transmission request.

Although the above description is made based on the RN for convenience, the operation corresponding to the above description may be equally or similarly performed in the eNode B. For example, the eNode B transmits a cell-specific parameter for SRS configuration to the RN. In addition, the RN transmits, to the RN, a UE-specific parameter indicating resources which may be used for aperiodic transmission of an SRS. Thereafter, the eNode B transmits request information for requesting SRS transmission to the RN. Thereafter, the eNode B receives the SRS from the RN. At this time, the SRS is transmitted within subframes indicated by the cell-specific parameter.

Although SRS configuration is described based on the RN, an identical/similar scheme is applicable to a UE. For example, in FIGS. 16 and 7 and descriptions thereof, a relation between an eNode B and an RN may be replaced with a relation between an eNode B and a macro UE and a relation between an RN and a relay UE. In particular, if a UE is aware that a dynamic SRS is not scheduled in a specific subframe, an operation for turning a transmission circuit off at the subframe is performed so as to reduce power consumption.

Figure 18:
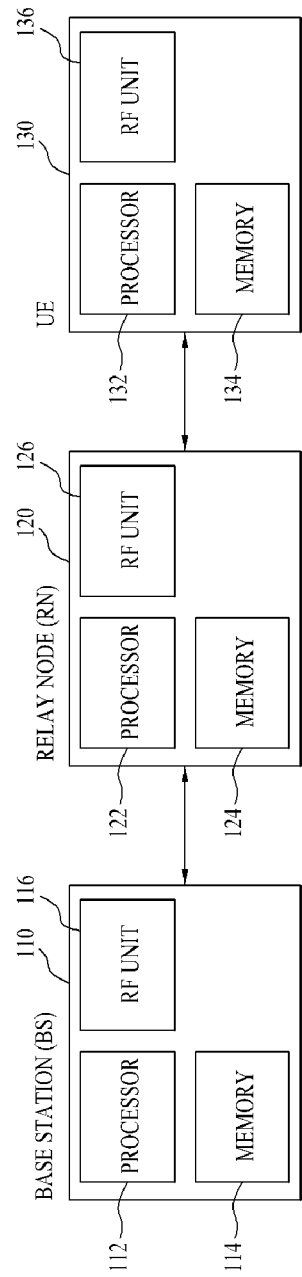
FIG. 18 is a diagram showing a base station, an RN and a user equipment (UE) applicable to the present invention.

FIG. 18 is a diagram showing a base station, an RN and a user equipment (UE) applicable to the present invention.

Referring to FIG. 18, a wireless communication system includes a base station (BS) 110, an RN 130 and a UE 130. Although a UE connected to an RN is shown for convenience, the UE may be connected to the BS.

The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with operation of the processor 112. The RF unit 116 is connected to the processor 112 so as to transmit and/or receive an RF signal. The RN 120 includes a processor 122, a memory 124 and an RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive a RF signal. The UE 130 includes a processor 132, a memory 134 and an RF unit 136. The processor 132 may be configured to implement the procedures and/or methods proposed by the present invention. The memory 134 is connected to the processor 132 so as to store a variety of information associated with the operation of the processor 132. The RF unit 136 is connected to the processor 132 so as to transmit and/or receive a RF signal. The BS 110, the RN 120 and/or the UE 130 may have a single antenna or multiple antennas.

The above-described embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a user equipment, a relay node and a base station. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term User Equipment (UE), subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. Software code may be stored in a memory unit so as to be executed by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to wireless communication system and, more particularly, to a method and device for transmitting a sounding reference signal.

The invention claimed is:

1. A method of transmitting a sounding reference signal (SRS) in a wireless communication system, the method comprising:
    receiving a first UE-specific configuration indicating possible subframes for aperiodic SRS transmission via a radio resource control (RRC) signaling, wherein the possible subframes are periodically configured;
    receiving a physical downlink control channel (PDCCH) signal including request information of requesting aperiodic SRS transmission; and
    transmitting at least one SRS one time in response to the request information within the possible subframes.

2. The method of claim 1, further comprising:
    receiving a cell-specific SRS configuration including 4-bit indicator, the 4-bit indicator being used to indicate one of a plurality of subframe sets,
    wherein the possible subframes are configured within the indicated one of the plurality of the subframe sets.

3. The method of claim 1, wherein the SRS is transmitted using a closest subframe among the possible subframes after a predetermined time has elapsed from the reception of the PDCCH signal.

4. The method of claim 1, further comprising:
    receiving a second UE-specific configuration for periodic SRS transmission; and
    periodically transmitting SRSs using the second UE-specific configuration.

5. A device configured to transmit a sounding reference signal (SRS) in a wireless communication system, the device comprising:
    a radio frequency (RF) unit; and
    a processor,
    wherein the processor is configured:
        to receive a first UE-specific configuration indicating possible subframes for aperiodic SRS transmission via a radio resource control (RRC) signaling, wherein the possible subframes are periodically configured,
to receive a physical downlink control channel (PDCCH) signal including request information of requesting aperiodic SRS transmission, and
to transmit at least one SRS one time in response to the request information within the possible subframes.

6. The device of claim 5, wherein the processor is further configured to receive a cell-specific SRS configuration including 4-bit indicator, the 4-bit indicator being used to indicate one of a plurality of subframe sets,
wherein the possible subframes are configured within the indicated one of the plurality of the subframe sets.

7. The device of claim 5, wherein the SRS is transmitted using a closest subframe among the possible subframes, after a predetermined time has elapsed from the reception of the PDCCH signal.

8. The device of claim 5, wherein the processor is further configured to receive a second UE-specific configuration for periodic SRS transmission, and to periodically transmit SRSs using the second UE-specific configuration.

9. A method of receiving a sounding reference signal (SRS) in a wireless communication system, the method comprising:
transmitting a first UE-specific configuration indicating possible subframes for aperiodic SRS transmission via a radio resource control (RRC) signaling, wherein the possible subframes are periodically configured;
transmitting a physical downlink control channel (PDCCH) signal including request information of requesting aperiodic SRS transmission; and
receiving at least one SRS one time in response to the request information within the possible subframes.

10. The method of claim 9, further comprising:
transmitting a cell-specific SRS configuration including 4-bit indicator, the 4-bit indicator being used to indicate one of a plurality of subframe sets,
wherein the possible subframes are configured within the indicated one of the plurality of the subframe sets.

11. The method of claim 9, wherein the SRS is transmitted using a closest subframe among the possible subframes after a predetermined time has elapsed from the transmission of the PDCCH signal.

12. The method of claim 9, further comprising:
transmitting a second UE-specific configuration for periodic SRS transmission; and
periodically receiving SRSs using the second UE-specific configuration.

13. A device configured to receive a sounding reference signal (SRS) in a wireless communication system, the device comprising:
a radio frequency (RF) unit; and
a processor,
wherein the processor is configured:
to transmit a first UE-specific configuration indicating possible subframes for aperiodic SRS transmission via a radio resource control (RRC) signaling, wherein the possible subframes are periodically configured,
to transmit a physical downlink control channel (PDCCH) signal including request information of requesting aperiodic SRS transmission, and
to receive at least one SRS one time in response to the request information within the possible subframes.

14. The device of claim 13, wherein the processor is further configured to transmit a cell-specific SRS configuration including 4-bit indicator, the 4-bit indicator being used to indicate one of a plurality of subframe sets,
wherein the possible subframes are configured within the indicated one of the plurality of the subframe sets.

15. The device of claim 13, wherein the SRS is transmitted using a closest subframe among the possible subframes, after a predetermined time has elapsed from the transmission of the PDCCH signal.

* * * * *